(12) United States Patent
Latvys

(10) Patent No.: US 11,866,274 B2
(45) Date of Patent: Jan. 9, 2024

(54) ROTATING CONTAINER DUMPER

(71) Applicant: ADVANCE LIFTS, INC., St. Charles, IL (US)

(72) Inventor: Evaldas Latvys, Itasca, IL (US)

(73) Assignee: ADVANCE LIFTS, INC., St. Charles, IL (US)

(*) Notice: Subject to any disclaimer, the term of this patent is extended or adjusted under 35 U.S.C. 154(b) by 231 days.

(21) Appl. No.: 17/165,132

(22) Filed: Feb. 2, 2021

(65) Prior Publication Data

US 2022/0242684 A1    Aug. 4, 2022

(51) Int. Cl.
  *B65G 65/23* (2006.01)
  *B66F 3/25* (2006.01)
  *B66F 3/36* (2006.01)
  *B66F 9/04* (2006.01)

(52) U.S. Cl.
  CPC ............... *B65G 65/23* (2013.01); *B66F 3/25* (2013.01); *B66F 3/36* (2013.01); *B66F 9/04* (2013.01)

(58) Field of Classification Search
  CPC ...................................................... B65G 65/23
  See application file for complete search history.

(56) References Cited

U.S. PATENT DOCUMENTS

| | | | |
|---|---|---|---|
| 4,095,707 A * | 6/1978 | Kowtko | B65G 65/23 414/407 |
| 4,280,780 A | 7/1981 | Neufeldt | |
| 4,479,751 A * | 10/1984 | Wyman | B65F 3/046 414/420 |
| 5,024,573 A * | 6/1991 | Redding | B65F 3/046 414/408 |
| 5,026,241 A * | 6/1991 | Wyman | B65F 3/046 414/303 |
| 5,288,200 A * | 2/1994 | Burgers | B67D 3/0083 414/758 |
| 5,772,385 A * | 6/1998 | Huntoon | B65F 3/043 414/420 |

(Continued)

FOREIGN PATENT DOCUMENTS

| | | |
|---|---|---|
| CN | 204822850 U | 12/2015 |
| CN | 105668083 B | 8/2017 |

(Continued)

OTHER PUBLICATIONS

Dynamic Air, "Quick-Flip™ Box Dumper," (2018). Retrieved from the Internet on Feb. 1, 2021: <URL:http://www.dynamicair.com/products/boxdumper.html>.

*Primary Examiner* — Jonathan Snelting
(74) *Attorney, Agent, or Firm* — MARSHALL, GERSTEIN & BORUN LLP; Michael P. Furmanek

(57) ABSTRACT

A rotating container dumper includes a bin assembly having at least one opening configured to receive a container, a frame that is configured to receive the bin assembly, and a linkage system that is operably coupled to the frame and the bin assembly. The linkage system is configured to rotate the bin assembly between a home position and a deployed position. In the home position, the bin assembly is disposed within the frame and a first opening of the at least one opening is positioned at a top of the bin assembly. In the deployed position, the bin assembly is disposed outside of the frame and the first opening of the at least one opening is positioned at a bottom of the bin assembly.

30 Claims, 11 Drawing Sheets

(56) References Cited

U.S. PATENT DOCUMENTS

| | | | |
|---|---|---|---|
| 6,702,135 B2 | 3/2004 | Pickler | |
| 9,089,147 B2 * | 7/2015 | Maile | B65G 65/23 |
| 9,126,755 B2 * | 9/2015 | Walter | B65G 65/23 |

FOREIGN PATENT DOCUMENTS

| | | |
|---|---|---|
| CN | 211307502 U | 8/2020 |
| DE | 9410245 U1 | 9/1994 |
| DE | 20112278 U1 | 2/2002 |
| EP | 576405 A1 | 12/1993 |
| GB | 749951 A | 6/1956 |
| JP | H09165198 A | 6/1997 |
| WO | WO-2001/05692 A1 | 1/2001 |

\* cited by examiner

ROTATING CONTAINER DUMPER

FIELD OF THE DISCLOSURE

The present disclosure relates to rotatable container dumpers and, more particularly, relates to container dumpers capable of rotating 180 degrees about a horizontal axis.

BACKGROUND

Containers are used in countless industries to retain items and materials therein. For example, industrial manufacturing processes can use container to hold and transport raw or finished materials, to store raw or finished materials until they are needed for another step in the manufacturing process, and/or to collect unused or unwanted material created during the manufacturing process. Containers are also used in sorting facilities (e.g., package warehouses, distribution centers, etc.), for example, to collect and retain packages so that they can be moved around the facility, to collect and retain packages traveling on a conveyor belt, and/or collect and retain packages being unloaded from a semi-trailer truck. Regardless of how the containers are being used, often times, the containers are large in size and built from durable materials which causes the container to be heavy and possibly manually immovable. As a result, the contents disposed within the container may need to be manually removed by hand which is a time consuming and labor-intensive process.

SUMMARY

In a first aspect of the present disclosure, a rotating container dumper may include a bin assembly having at least one opening, a frame configured to receive the bin assembly; and a linkage system operably coupled to the frame and the bin assembly. The linkage system may be configured to rotate the bin assembly between a home position, where the bin assembly is disposed within the frame and a first opening of the at least one opening is positioned at a top of the bin assembly, and a deployed position where the bin assembly is disposed outside of the frame and the first opening of the at least one opening is positioned at a bottom of the bin assembly.

In a second aspect of the present disclosure, a method of rotating a bin assembly may include providing a frame having a plurality of side members and a plurality of cross members extending between the plurality of side members; disposing a bin assembly having at least one opening within the frame in a home position where a first opening of the at least one opening is positioned at a top of the bin assembly, a linkage system operably coupling the bin assembly to the frame; rotating the bin assembly, via the linkage system, from the home position to a deployed position, where the bin assembly is disposed outside of the frame and the first opening of the at least one opening is positioned at a bottom of the bin assembly; and rotating the bin assembly, via the linkage system, from the deployed position to the home position.

In a third aspect of the disclosure, a rotating dumper may include a bin assembly having a plurality of openings for receiving a container; a frame configured to receive the bin assembly; a linkage system operably coupled to the frame and the bin assembly; and a coupling member extending between the linkage system and the frame. In accordance with the third aspect, the linkage system may be configured to rotate the bin assembly between a home position, where the bin assembly is disposed within the frame and a first opening of the plurality of openings is positioned at a top of the bin assembly, and a deployed position, where the bin assembly is disposed outside of the frame and the first opening of the plurality of openings is positioned at a bottom of the bin assembly.

In accordance with the foregoing first, second, and/or third aspects, the rotating container dumper and/or the method of rotating the container dumper may further include any one or more of the following preferred forms.

In one preferred form, the linkage system may be configured to rotate the bin assembly 180 degrees between the home position and the deployed position.

In one preferred form, the rotating bin assembly also may include a hydraulic system or electric actuator that is operably coupled to the linkage system and the frame. The hydraulic system may include a hydraulic fluid reservoir, a pump, a plurality of pistons, a plurality of hoses fluidly coupling the hydraulic fluid reservoir, the pump, and the at least one piston, and a controller.

In another preferred form, the linkage system may include a first set of bars and a second set of bars. Each of the first and second sets of bars includes a first bar, a second bar, and a third bar. The first bar may be rotatably coupled to the frame and the second bar, the second bar may be rotatably coupled to the first and third bars, and the third bar may be rotatably coupled to the second bar and the frame.

In another preferred form, the first bar may have a linear, elongate body, the second bar may have a body having a J-shape, and the third bar may have a body having a Y-shape.

In another preferred form, the frame may include a plurality of side members and a plurality of cross members extending between the plurality of side members.

In another preferred form, a first piston of the plurality of pistons may be operably coupled to the first set of bars and a second piston of the plurality of pistons may be operably coupled to the second set of bars, such that actuation of the first and second pistons of the plurality of pistons causes the first and second sets of bars, respectively, to rotate thereby causing the bin assembly to rotate.

In another preferred form, the controller may be configured to operate the plurality of pistons such that the bin assembly shakes at or before the bin assembly is in the deployed position.

In another preferred form, the controller may be configured to operate the plurality of pistons such that an angular velocity of the bin assembly is reduced before the bin assembly is in the home position.

In another preferred form, a coupling structure may be secured to the bin assembly and operably coupled to the linkage system.

In another preferred form, the rotating container dumper may include at least one sensor disposed on the frame and communicatively coupled to the controller. The at least one sensor may be configured to detect an angular position of the bin assembly.

In another preferred form, the rotating container dumper may include a coupling member that may be coupled to the bin assembly and extend between the first and second set of bars of the linkage system.

In another preferred form, the coupling structures may include a coupling member, a first stopper coupled to and extending upwardly from the coupling member, and a second stopper coupled to and extending downwardly from the coupling member. The coupling member may be coupled to the bin assembly and extend between the first and second sets of bars of the linkage system.

In another preferred form, when the bin assembly is in the home position, the second stopper is in contact with a first cross member of the plurality of cross bars, and when the bin assembly is in the deployed position, the first stopper is in contact with a second cross member of the plurality of cross members.

In another preferred form, the bin assembly may include a lip disposed proximate a first opening of the plurality of openings. The lip may extend from the bin assembly such that the lip guides items out of the first opening when the bin assembly is in the deployed position.

In another preferred form, the container dumper may include a plurality of securement members disposed on the frame. The plurality of securement members may be configured to secure the frame to a surface.

In another preferred form, rotating the bin assembly from the home position to the deployed position may include rotating the bin assembly 180 degrees from the home position to the deployed position. Rotating the bin assembly from the deployed position to the home position may include rotating the bin assembly 180 degrees from the deployed position to the home position.

In another preferred form, disposing the bin assembly within the frame may include disposing the bin assembly within the frame such that a center of gravity of the bin assembly remains within an envelope of the frame when rotating the bin assembly from the home position to the deployed position.

In another preferred form, disposing the bin assembly within the frame may include disposing the bin assembly within the frame such that a center of gravity of the bin assembly remains within an envelope of the frame when rotating the bin assembly from the deployed position to the home position.

In another preferred form, rotating the bin assembly from the home position to the deployed position may include exerting a clockwise rotational force on the linkage system via a hydraulic system or an electric actuator, the hydraulic system may be operably coupled to the frame and the linkage system. Rotating the bin assembly from the deployed position to the home position may include exerting a counterclockwise rotational force on the linkage system via the hydraulic system or the electric actuator.

In another preferred form, rotating the bin assembly from the home position to the deployed position may include shaking the bin assembly, via a hydraulic system or an electric actuator, at or before the bin assembly is in the deployed position, the hydraulic system or the electric actuator may be operably coupled to the frame and the linkage system.

In another preferred form, rotating the bin assembly from the deployed position to the home position may include reducing an angular velocity of the bin assembly, via a hydraulic system or an electric actuator, before the bin assembly is in the home position, the hydraulic system or the electric actuator may be operably coupled to the frame and the linkage system.

DETAILED DESCRIPTION

A rotating container dumper, as disclosed herein, is capable of rotating a bin assembly from a home position to a deployed position such that the contents within a container securely disposed in the bin assembly are emptied. As the container dumper rotates the bin assembly from the home position to the deployed position, the container dumper rotates the bin assembly by 180°. A linkage system that is coupled to the bin assembly permits the 180° rotation of the bin assembly. So configured, the container dumper can be used to move materials between locations in a facility that requires items to be moved, for example, from one conveyor belt to another conveyor belt, from a first level to a second level, and/or a first stage of material processing to a second stage of material processing. Similarly, the container dumper can be used to unload materials from or load material into a truck or another container.

Figure 1:
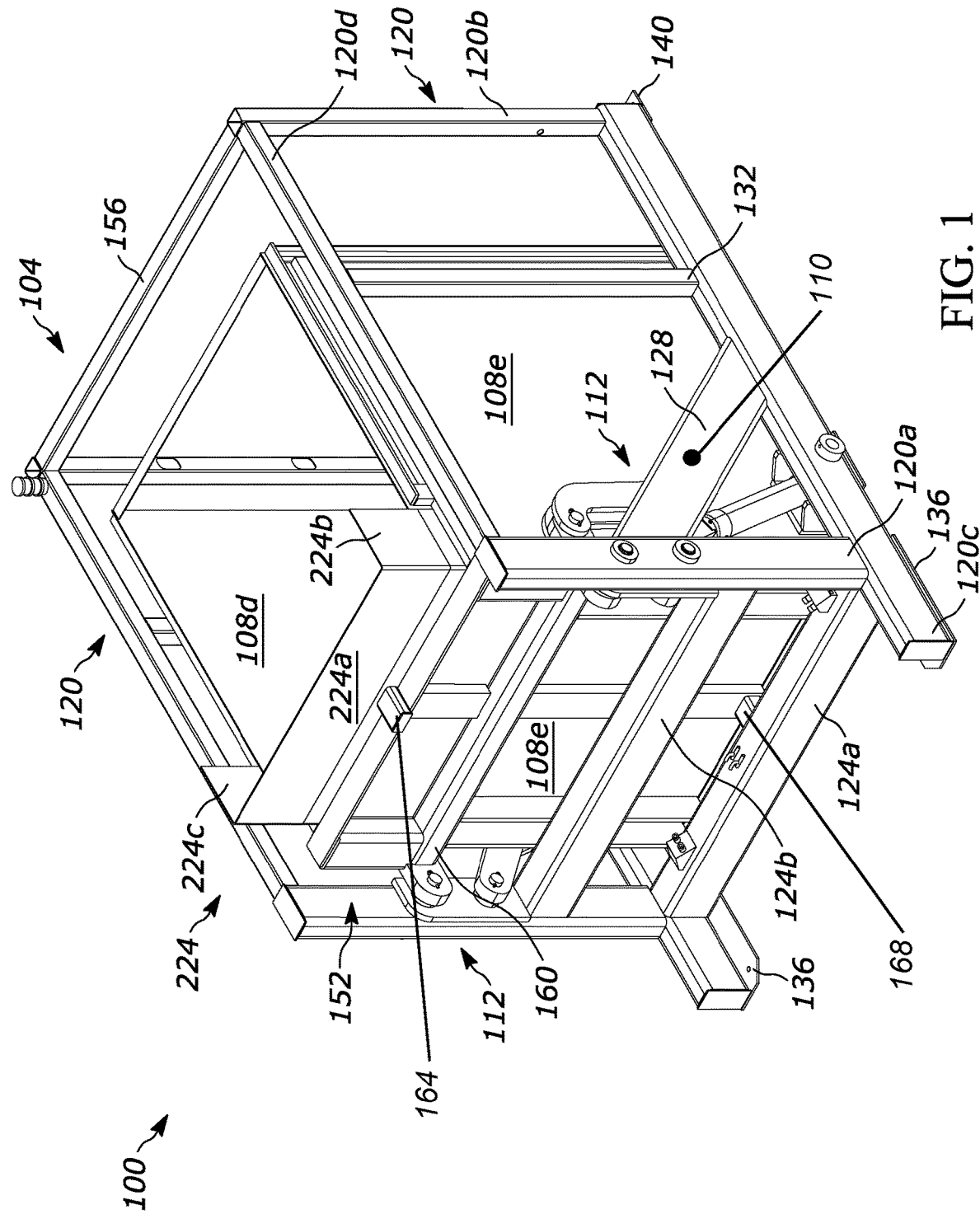
FIG. 1 is a rear perspective view of a rotating container dumper in a home position, constructed in accordance with the teachings of the present disclosure.

FIG. 1 illustrates a perspective view of the rotating container dumper 100 in the home position. The container dumper 100 includes a frame 104, a bin assembly 108, a linkage system 112, and an actuator 118. The frame 104 is configured to receive the bin assembly 108. The frame 104 is also configured to retain the linkage system 112 and the actuator 118 in a secure manner. In particular, the frame 104 is configured to have a footprint large enough to maintain a center of gravity within an envelope of the frame 104 of the container dumper 100 so that the container dumper 100 remains balanced while rotating the bin assembly 108. To maintain the center of gravity within the envelope of the frame 104, the frame 104 includes a plurality of side members 120 and a plurality of cross members 124 that extends between the plurality of side members 120. Each side member in the plurality of side members 120 includes a first vertical member 120a, a second vertical member 120b disposed away from and parallel to the first vertical member 120a, a first horizontal member 120c, and a second horizontal member 120d disposed away from and parallel to the first horizontal member 120c. The first horizontal member 120c extends from the second vertical member 120b toward and past the first vertical member 120a. The second horizontal member 120d, however, extends from the first and second vertical members 120*a*, 120*b*. In other examples, the second horizontal member 120*d* can extend between the first and second vertical members 120*a*, 120*b*.

The plurality of cross members 124 connect the plurality of side members 120 to one another. The plurality of cross members 124 are fixedly coupled to each side member of the plurality of side members 120. In other examples, the plurality of cross members 124 could be releasably coupled to each side member of the plurality of side members 120. As best illustrated in FIG. 1, the plurality of cross members 124 includes a first cross member 124*a* and a second cross member 124*b* disposed away from and parallel to the first cross member 124*a*. The first cross member 124*a* extends between the first horizontal members 120*c* of the plurality of side members 120 and the second cross member 124*b* extends between the first vertical members 120*a* of the plurality of side members 120.

As illustrated in FIG. 1, each plurality of side members 120 also includes a first reinforcement member 128 and a second reinforce member 132 that increase the structural integrity to the frame 104. The first reinforcement member 128 extends from the first horizontal member 120*c* to the first vertical member 120*a* at an angle. For example, the first reinforcement member 128 can extend from the first horizontal member 120*c* to the first vertical member 120*a* at a 45° angle. The second reinforcement member 132 extends from the first horizontal member 120*c* toward the second horizontal member 120*d*. The second reinforcement member 132 is also disposed on the first horizontal member 120*a* at a location between the first reinforcement member 128 and the second vertical member 120*b*.

Each side member of the plurality of side members 120 may also include at least one securement member 136, 140 that is configured to releasably attach the container dumper 100 to either a floor of a manufacturing facility or other structure, or fixture, in the facility. As illustrated in FIG. 1, the at least one securement member 136, 140 is a plate having an aperture that is configured to receive a fastener (e.g., screw, bolt) used to secure the container dumper 100 to the floor of the facility or other structure. In the example illustrated in FIG. 1, a first securement member 136 is disposed proximate a first end of the first horizontal member 120*c* and a second securement member 140 is disposed proximate a second end of the first horizontal member 120*c*.

The bin assembly 108 has at least one opening for receiving a container (not illustrated) such as, for example, a cart, a basket, a Gaylord box, a pallet, etc. The container is secured within the bin assembly 108 so that when the bin assembly 108 rotates the container remains within the bin assembly 108 while the items within the container are dumped therefrom. As illustrated in FIG. 1, the bin assembly 108 includes a set of walls 144, a plurality of openings 148, and a coupling structure 152. The set of walls 144 is configured as, for example, a rectangular prism and forms the plurality of openings 148. In other examples, however, the bin assembly 108 can take other shapes depending on the shape and style of container received within the bin assembly 108. In particular, the plurality of openings 148 includes a first opening 148*a* disposed at a front side 108*a* of the bin assembly 108 and a second opening 148*b* disposed at a top side 108*b* of the bin assembly 108. A crossbar 156 extends between first and second sides 108*c*, 108*d* of the bin assembly 108 providing structural support between the first and second openings 148*a*, 148*b*. So configured, items and/or containers with items disposed therein may be loaded into the bin assembly 108 through the first opening 148*a* or the second opening 148*b* thereby accommodating various ways of loading the bin assembly 108. For example, a user could load a container into the bin assembly 108 by manually placing the container in the bin assembly 108 through the first opening 148*a*. Items and containers could also be loaded into the bin assembly 108 108 through the second opening 148*b* from, for example, heavy machinery, platforms having a height greater than or equal to the height of the bin assembly 108, conveyor belts, truck beds, and trailer truck beds. Further, an empty container may be loaded into the bin assembly 108 through the first opening 148*a* and, once secured therein, items may be placed directly into the container through the second opening 148*b* of the bin assembly 108.

While not illustrated herein, the bin assembly 108 can include, in some embodiments, a door that seals the first opening 148*a* in whole or in part. This may allow loose items (e.g., concrete, grains, foods, liquids) to be retained within the bin assembly 108 without being first placed within a container. The bin assembly 108 also includes a securement mechanism (not shown) that releasably retains containers disposed within the bin assembly 108. For example, the securement mechanism can be a lip, a crossbar, a snap-fit connection, a loop configured to receive a strap or other fastening mechanism, a prong, a lid, or any other known securement mechanism used to secure the container in the bin assembly 108 during rotation/transportation.

The coupling structure 152 is disposed on a back side 108*e* of the bin assembly 108 and couples the bin assembly 108 to the linkage system 112. As best illustrated in FIG. 1, the coupling structure 152 includes a coupling member 160, a first stopper structure 164, and a second stopper structure 168. The coupling member 160 extends along a width of the bin assembly 108 and is coupled to the linkage system 112. The first stopper structure 164 extends from the coupling member 160 upward toward the top side 108*b* of the bin assembly 108 and the second stopper structure 168 extends from the coupling member 160 downward toward a bottom side 108*f* of the bin assembly 108. The first stopper structure 164 stops the bin assembly 108 during rotation by coming into contact with the second cross member 124*b*. The second stopper structure 168 stops the bin assembly 108 during rotation by coming into contact with the first cross member 124*a*.

The bin assembly 108 also includes a lip 224 that may act as a barrier while contents are emptied from the container disposed within the bin assembly 108. In doing so, the lip 224 may prevent the contents within the container from coming into contact with the bin assembly 108, frame 104, or other components of the container dumper 100. As illustrated in FIG. 1, the lip 224 includes a first surface 224*a* coupled to the back side 108*e* of the bin assembly 108, a second surface 224*b* coupled to the first side 108*c* of the bin assembly 108, and a third surface 224*c* coupled to the second side 108*d* of the bin assembly 108. The first surface 224*a* extends along the entire width of the back side 108*e* of the bin assembly 108. But, in other examples, the first surface 224*a* can extend along a portion of the width of the back side 108*e* of the bin assembly 108. The second and third surfaces 224*b*, 224*c* extend along a portion of the first and second sides 108*c* of the bin assembly 108, respectively.

Figure 2:
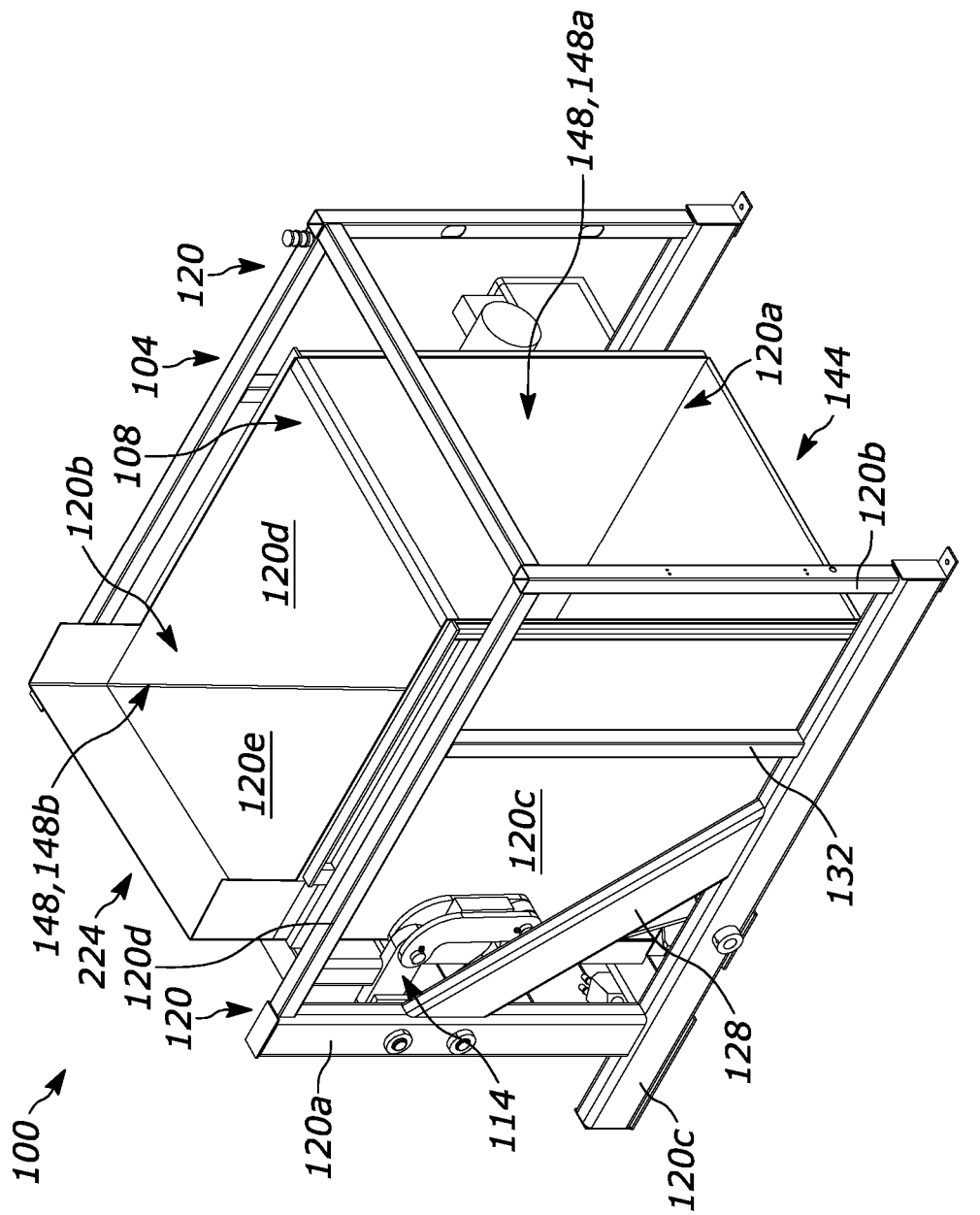
FIG. 2 is a front perspective view of the rotating container dumper of FIG. 1.
Figure 3:
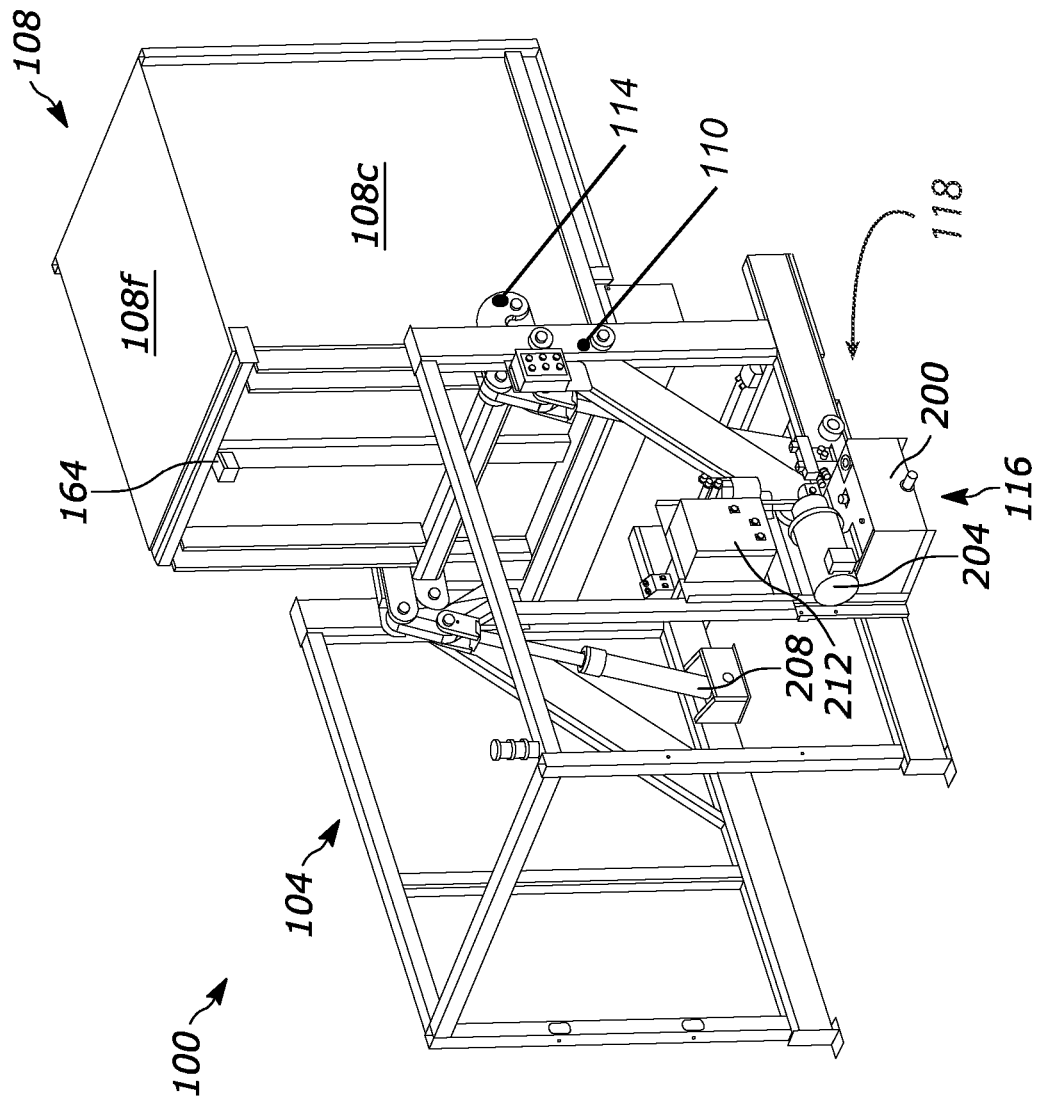
FIG. 3 is a rear perspective view of the rotating container dumper of FIG. 1 in a deployed position.
Figure 6:
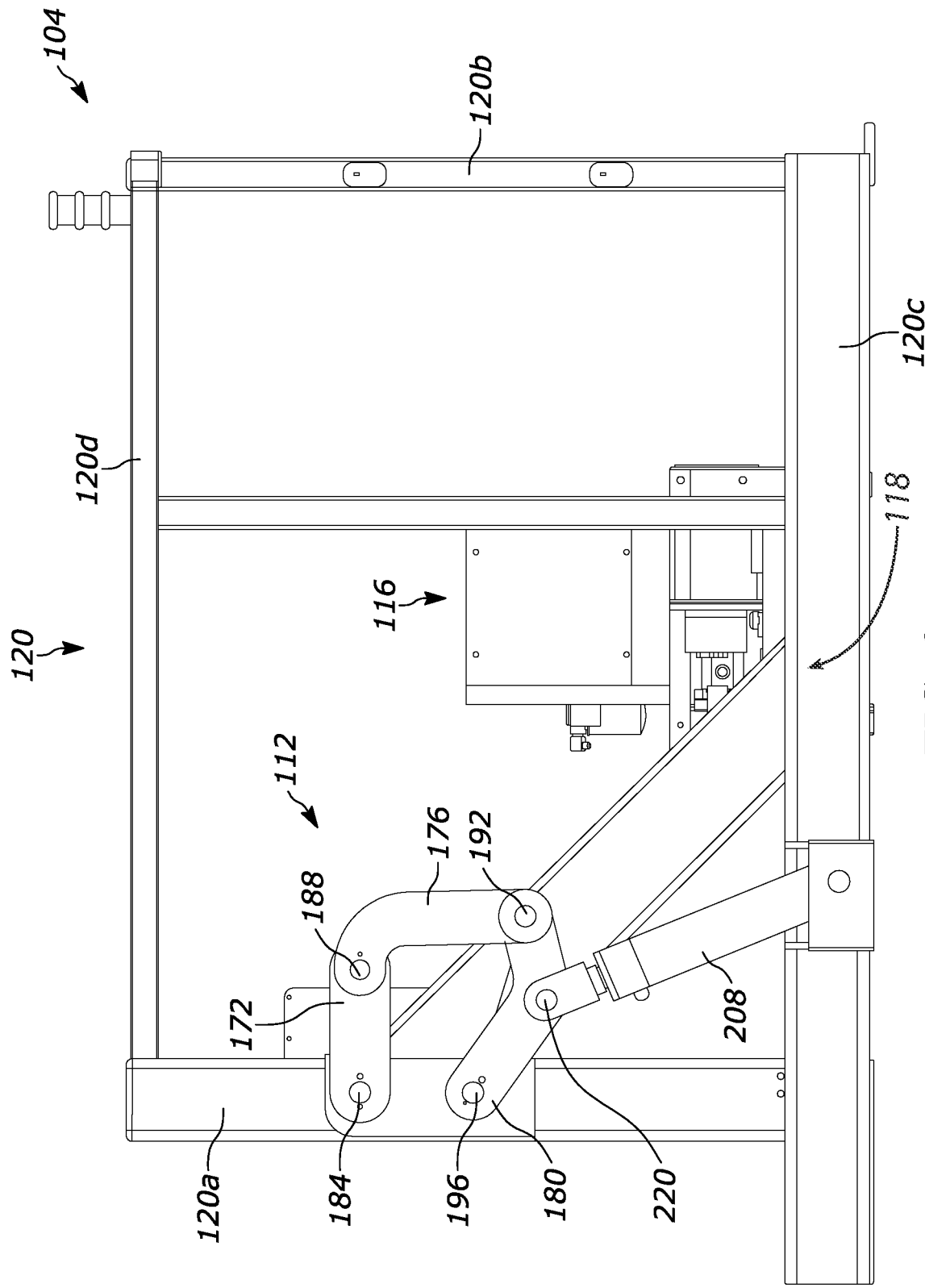
FIG. 6 is a side view of the section of the rotating container dumper of FIG. 5 with certain elements removed for visibility.
Figure 7:
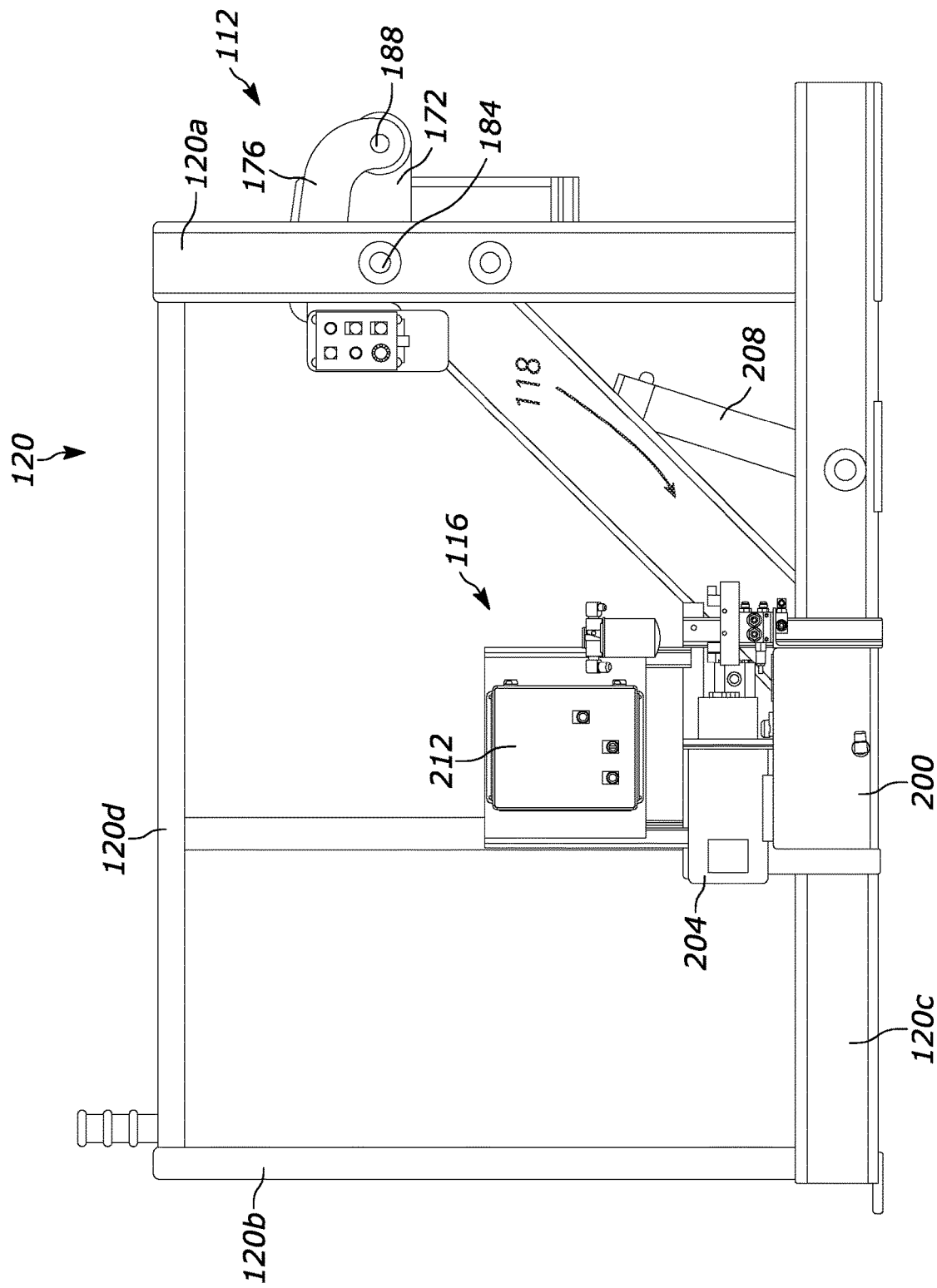
FIG. 7 is a side view of a section of the rotating container dumper of FIG. 3 with certain elements removed for visibility.
Figure 8:
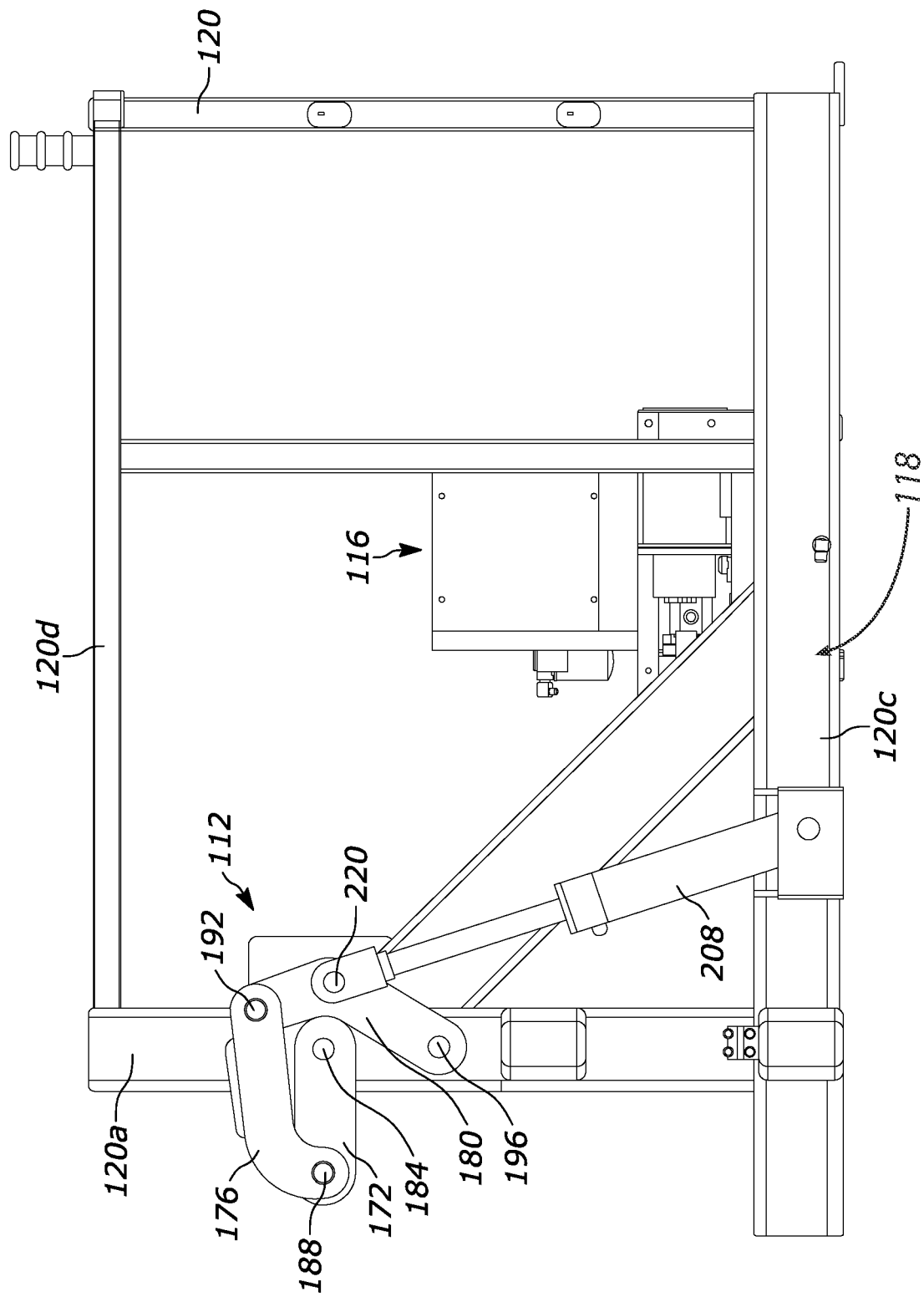
FIG. 8 is a side view of the section of the rotating container dumper of FIG. 7 with certain elements removed for visibility.

The linkage system 112, in combination with the actuator 118, rotates the bin assembly 108 by 180° between the home position (FIGS. 1, 2, 5, and 6) and the deployed position (FIGS. 3, 4, 7, and 8). To do so, the linkage system 112 includes a first set of bars 112*a* and a second set of bars 112*b*, each of which is coupled to one of the first vertical members 120*a*. Each of the first and second set of bars 112*a*, 112*b* includes a first bar 172, a second bar 176, and a third bar 180. As best illustrated in FIGS. 6 and 8, the first bar 172 is an elongate body having a linear shape, the second bar 176 is an elongate body having a "J" shape, and the third bar 180 is an elongate body having a partial "Y" shape. The first bar 172 is rotatably coupled to the first vertical member 120*a* at a first joint 184 and rotatably coupled to the second bar at a second joint 188. As best illustrated in FIGS. 1 and 3, the coupling member 160 of the coupling structure 152 is securely coupled to the first bar 172, which allows the rotational forces exerted on the linkage system 112 to be imparted on the bin assembly 108. So configured, coupling the coupling member 160 to the first bar 172 allows for rotation of the bin assembly 108 between the home position and the deployed position. The second bar 174 is rotatably coupled to the first bar 172 at the second joint 188 and rotatably coupled to the third bar 180 at a third joint 192. The third bar 180 is coupled to the second bar 174 at the third joint 192 and rotatably coupled to the first vertical member 120*a* at a fourth joint 196.

The actuator 118 is operably coupled to the linkage system 112 and, to rotate the bin assembly 108 from the home position to the deployed position and vice-a-versa, the actuator 118 applies a force to a part of the linkage system 112. In particular, the actuator 118 exerts a force on the linkage system 112 thereby rotating the linkage system 112 about each of the joints 184, 188, 192, 196, which, in turn, rotates the bin assembly 108 between the home position and the deployed position. In some examples, the actuator 118 can be a hydraulic system 116. In such an example, the hydraulic system 116 can be operably coupled to the linkage system 112 and securely coupled to the frame 104. The hydraulic system 116 may include, at least, a hydraulic fluid reservoir 200, a pump 204, a plurality of pistons 208, and a plurality of hoses (not illustrated) fluidly coupling the hydraulic fluid reservoir 200, the pump 204, and the plurality of pistons 208. As best illustrated in FIGS. 6 and 8, each piston in the plurality of pistons 208 is operably coupled to the third bar 180 at a fifth joint 220. The fifth joint 220 is disposed on the third bar 180 between the third and fourth joints 192, 196, such that the third bar 180 rotates about the fourth joint 196 when each piston of the plurality of pistons 208 exerts a force on the third bar 180. The hydraulic system 116 may also include a controller 212 that operates the hydraulic system 116 and causes the bin assembly 108 to rotate between the home position and the deployed position. While the actuator 118 has been discussed as being the hydraulic system 116, in other examples, the actuator 118 can be an electric actuator that rotates the bin assembly 108 between the home position and the deployed position.

The container dumper 100 may also include a sensor 216 that detects rotational motion of the linkage system 112. The sensor 216 may be disposed on any of the bars 172, 176, 180 or proximate any of the bars 172, 176, 180 to detect the rotational motion of the linkage system 112. So configured, the sensor 216 creates a feedback loop for the controller 212 thereby providing the controller 212 with the information necessary to calculate, or determine, the position of the bin assembly 108 during rotation.

Figure 9:
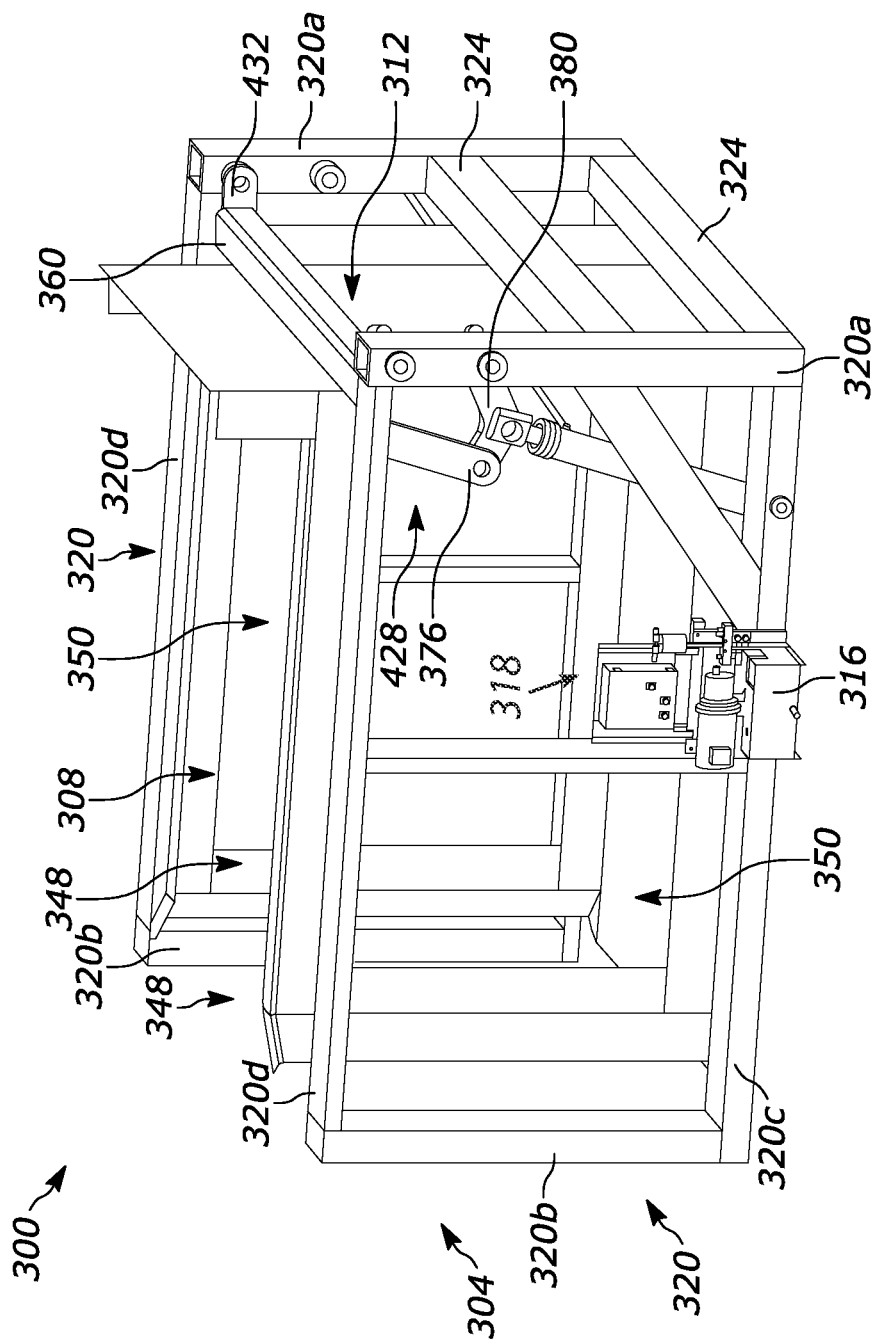
FIG. 9 is a side perspective view of another embodiment of a rotating container dumper in a home position, constructed in accordance with the teachings of the present disclosure.
Figure 10:
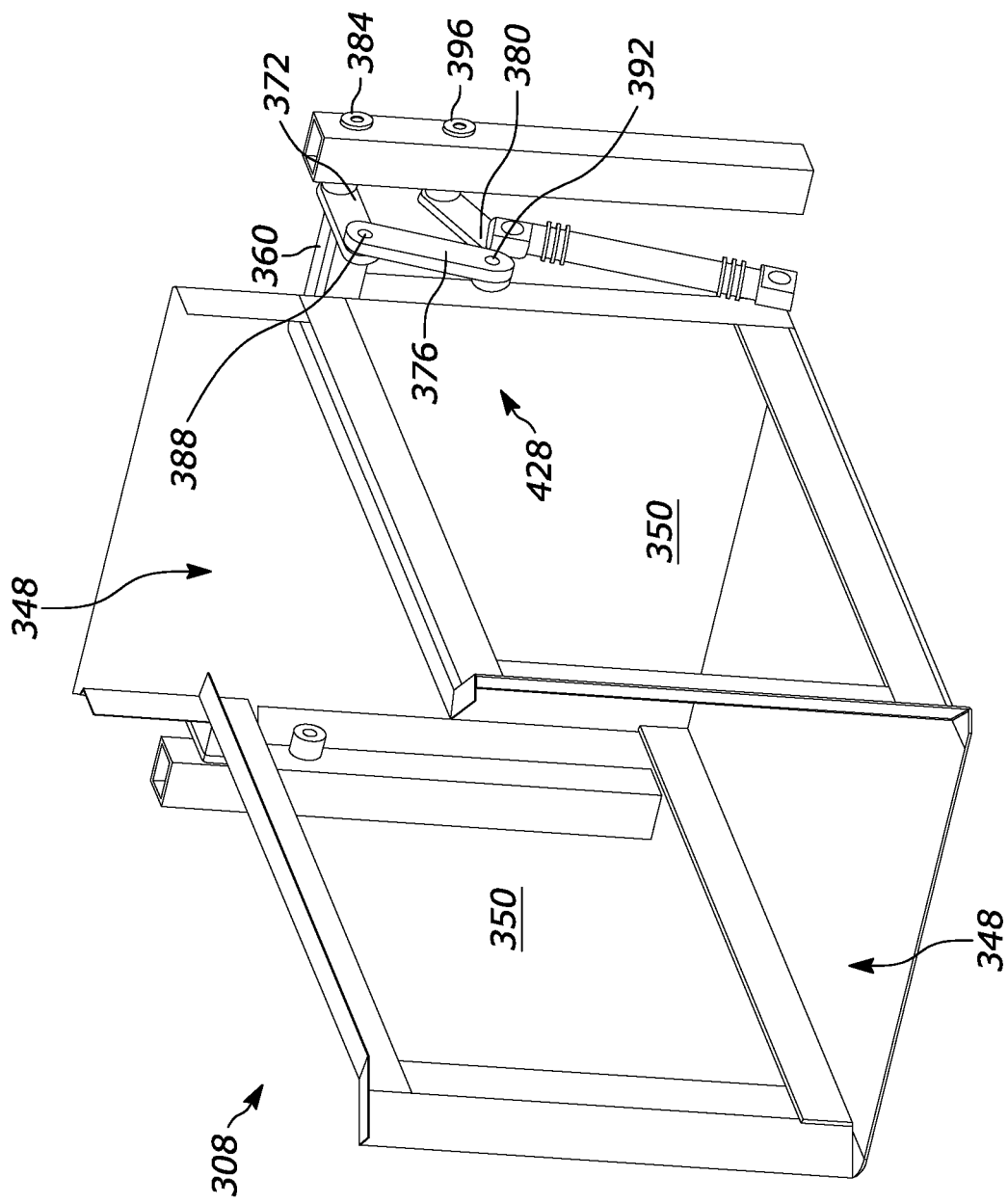
FIG. 10 is a rear perspective view of the rotating container dumper of FIG. 9 with certain elements removed for visibility.
Figure 11:
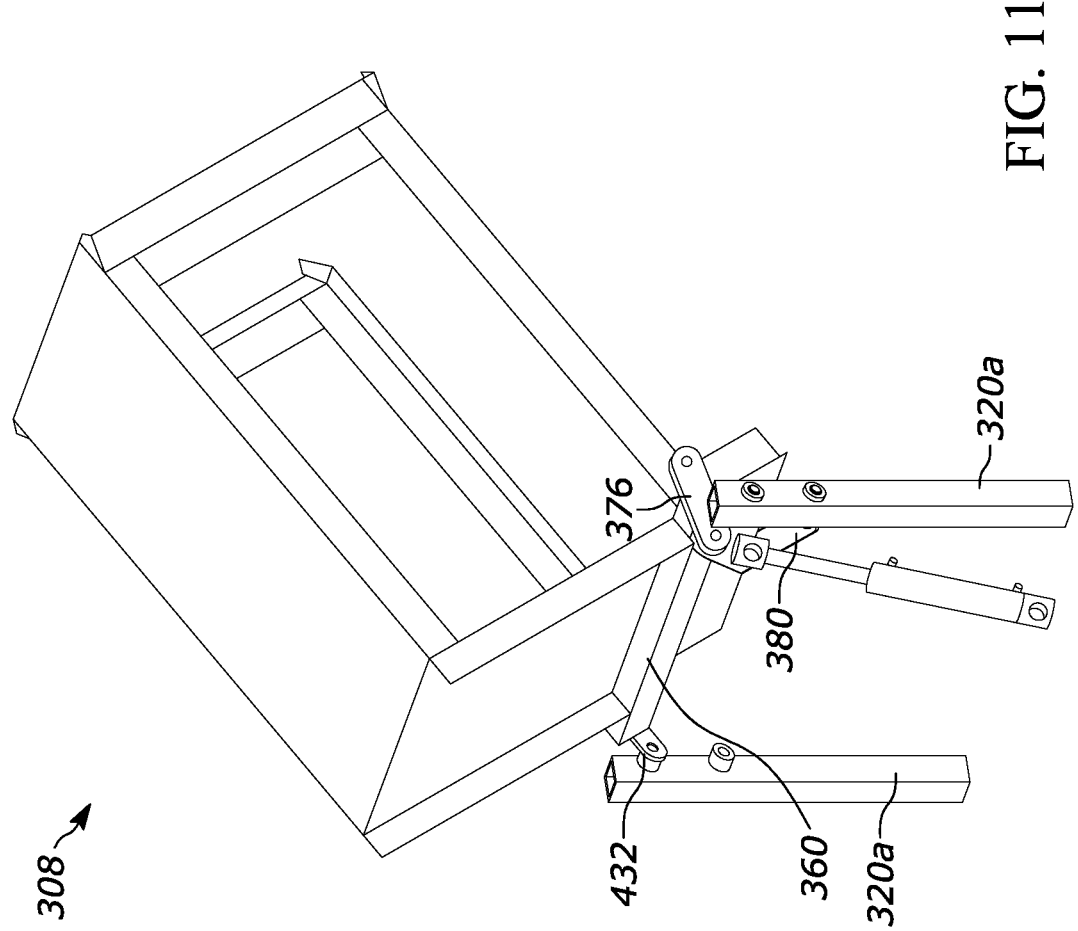
FIG. 11 is a rear perspective view of the rotating container dumper of FIG. 10 in a deployed position with certain elements removed for visibility.

FIGS. 9-11 illustrate another example of a container dumper 300 constructed in accordance with the present disclosure. The container dumper 300 of FIGS. 9-11 is similar to the container dumper 100 of FIGS. 1-8, except the container dumper 300 includes a linkage system 312 that is different than the linkage system 112 of the container dumper 100. In particular, the linkage system 312 of the container dumper 300 of FIGS. 9-11 includes a set of bars 428 whereas the linkage system 112 of the container dumper 100 of FIGS. 1-8 includes the first and second sets of bars 112*a*, 112*b*. Thus, for ease of reference and to the extent possible, the same or similar components of the container dumper 300 of FIGS. 9-11 will retain the same reference numbers as outlined above with respect to the container dumper 100 of FIGS. 1-8, although the reference numbers will be increased by 200.

Similar to the container dumper 100 of FIGS. 1-8, the container dumper 300 of FIGS. 9-11 includes a frame 304, a bin assembly 308, a linkage system 312, and an actuator 318 (e.g., a hydraulic system, an electric actuator). The frame 304 is configured to receive the bin assembly 308 and to retain the linkage system 312 and the hydraulic system 316 in a secure manner. The frame includes a plurality of side members 320 and a plurality of cross members 324 that extends between the plurality of side members 120. Each side member in the plurality of side members 320 includes a first vertical member 320*a*, a second vertical member 320*b* disposed away from and parallel to the first vertical member 320*a*, a first horizontal member 320*c*, and a second horizontal member 320*d* disposed away from and parallel to the first horizontal member 320*c*.

Also similar to the bin assembly 108 of FIGS. 1-8, the bin assembly 308 of FIGS. 9-11 has a plurality of openings 348 for receiving a container (not illustrated) such as, for example, a cart, a basket, a Gaylord box, a pallet, etc. The container is secured within the assembly 308 in a similar manner as described with respect to the embodiment of FIGS. 1-8. Unlike the bin assembly 108 of FIGS. 1-8, the bin assembly 308 of FIGS. 9-11 includes additional openings 350 on the sides of the bin assembly 308 in addition to the plurality of openings 348.

Unlike the container dumper 100 of FIGS. 1-8, the container dumper 300 of FIGS. 9-11 includes a different linkage system 312. Much like the linkage system 112 of FIGS. 1-8, the linkage system 312 of FIGS. 9-11 rotates the bin assembly 308 by 180° between the home position (FIGS. 9 and 10) and the deployed position (FIG. 11). To do so, the linkage system 312 includes a set of bars 428 that is coupled to the first horizontal member 320*c* and a coupling member 360 that extends between the plurality of side members 320 of the frame 304. In particular, the linkage system 312 includes a first bar 372, a second bar 376, and a third bar 380. As best illustrated in FIG. 10, the first bar 372 is an elongate body having a linear shape, the second bar 376 is an elongate body having a linear shape, and the third bar 380 is an elongate body having a "J" shape. A fourth bar 432 is coupled to the frame 304 opposite the first bar 372. The fourth bar 432 is also rotatably coupled to the coupling member 360.

The first bar 372 is rotatably coupled to the first vertical member 320*a* at a first joint 384 and rotatably coupled to the second bar 376 at a second joint 388. As best illustrated in FIGS. 9 and 11, the coupling member 360 is securely coupled to the first bar 372 and the fourth bar 432, which allows the rotational forces exerted on the linkage system 312 to be imparted on the bin assembly 308. So configured, coupling the coupling member 360 to the first bar 372 and the fourth bar 432 allows for rotation of the bin assembly 308 between the home position and the deployed position. The second bar 374 is rotatably coupled to the first bar 372 at the second joint 388 and rotatably coupled to the third bar 380 at a third joint 392. The third bar 380 is coupled to the second bar 374 at the third joint 392 and rotatably coupled to the first vertical member 320*a* at a fourth joint 396.

As configured, the coupling member 360 receives the torsional forces exerted on the linkage system 312 from the actuator 318, which can be a hydraulic system 316 or an electric actuator, and, because the linkage system 312 of FIGS. 9-11 includes only one set of bars 428, the coupling member 360 may experience greater torsional forces than, for example, the linkage system 112 of FIGS. 1-8. Accordingly, the coupling member 360 of FIGS. 9-11 has a polar moment of inertia that is great enough to resist deformation under the torsional forces experienced during rotation of the bin assembly 308 from the home position to the deployed position and during rotation of the bin assembly 308 from the deployed position to the home position. For example, the coupling member 360 of FIGS. 9-11 can have a polar moment of inertia that is greater than a polar moment of inertia of the coupling member 160 of FIGS. 1-8. In other words, the coupling member 360 has a rigidity that resists torsional deformation as the linkage system rotates the bin assembly 108 from the home position to the deployed position.

As briefly mentioned above, interaction of the actuator 118 with the linkage system 112 rotates the bin assembly 108 between the home position (FIGS. 1, 2, 5, and 6) and the deployed position (FIGS. 3, 4, 7, and 8). To rotate the bin assembly 108 between the home position and the deployed position, the plurality of pistons 208 exerts a force on the third bar 180 at the fifth joint 220 such that the third bar 180 rotates about the fourth joint 196. However, as the third bar 180 rotates about the fourth joint 196, the first and second bars 172, 176 also rotate by virtue of being operably coupled to the third bar 180. So configured, the first bar 172 can rotate 180° because the first bar 172 and the third bar 180 are rotatable coupled to the first vertical member 120a. Rotating the first bar 172 in turn rotates the bin assembly 108 because the coupling member 160 of the coupling structure 152 is coupled to both the first bar 172 and the bin assembly 108. Accordingly, as each piston in the plurality of pistons 208 extends (FIG. 8) and retracts (FIG. 6) the linkage system 112 rotates the bin assembly 108 between the home position and the deployed position.

Accordingly, a method of rotating a container dumper 100, 300 using the above discussed principles includes providing a frame 104, 304 having a plurality of side members 120, 320 and a plurality of cross members 124, 324 extending between the plurality of side members 120, 320. The method includes disposing a bin assembly 108, 308 having at least one opening 148, 348 within the frame 104, 304 in a home position where a first opening 148 of the at least one opening 148, 348 is positioned at a top of the bin assembly 108, 308, a linkage system 112, 312 operably coupling the bin assembly 108, 308 to the frame 104, 304. The method includes rotating the bin assembly 108, 308, via the linkage system 112, 312, from the home position to a deployed position, where the bin assembly 108, 308 is disposed outside of the frame 104, 304 and the first opening 148 of the at least one opening 108, 308 is positioned at a bottom of the bin assembly 108, 308. The method includes rotating the bin assembly 108, 308, via the linkage system 112, 312, from the deployed position to the home position.

In the method, rotating the bin assembly 108, 308 from the home position to the deployed position may include rotating the bin assembly 108, 308 one hundred eighty (180) degrees from the home position to the deployed position and rotating the bin assembly 108, 308 from the deployed position to the home position may include rotating the bin assembly 108, 308 one hundred and eighty (180) degrees from the deployed position to the home position. In the method, disposing the bin assembly 108, 308 within the frame 104, 304 may include disposing the bin assembly 108, 308 within the frame 104, 304 such that a center of gravity of the bin assembly 108, 308 remains within an envelope of the frame 104, 304 when rotating the bin assembly 108, 308 from the home position to the deployed position. In the method, disposing the bin assembly 108, 308 within the frame 104, 304 may include disposing the bin assembly 108, 308 within the frame 104, 304 such that a center of gravity of the bin assembly 108, 308 remains within an envelope of the frame 104, 304 when rotating the bin assembly 108, 308 from the deployed position to the home position. In the method, rotating the bin assembly 108, 308 from the home position to the deployed position may include exerting a clockwise rotational force on the linkage system 112, 312 via a hydraulic system 116, 316, the hydraulic system 116, 316 being operably coupled to the frame 104, 304 and the linkage system 112, 312. In other examples, rotating the bin assembly 108, 308 from the home position to the deployed position may include exerting a clockwise rotational force on the linkage system 112, 312 via an electric actuator, the electric actuator being operably coupled to the frame 104, 304 and the linkage system 112, 312. In the method, rotating the bin assembly 108, 308 from the deployed position to the home position may include exerting a counterclockwise rotational force on the linkage system 112, 312 via the hydraulic system 116, 316. In other examples, rotating the bin assembly 108, 308 from the deployed position to the home position may include exerting a counterclockwise rotational force on the linkage system 112, 312 via the electric actuator.

In the method, rotating the bin assembly 108, 308 from the home position to the deployed position may include shaking the bin assembly 108, 308, via a hydraulic system 116, 316, at or before the bin assembly 108, 308 is in the deployed position, the hydraulic system 116, 316 being operably coupled to the frame 104, 304 and the linkage system 112, 312. In other examples, rotating the bin assembly 108, 308 from the home position to the deployed position may include shaking the bin assembly 108, 308, via an electric actuator, at or before the bin assembly 108, 308 is in the deployed position, the electric actuator being operably coupled to the frame 104, 304 and the linkage system 112, 312 In the method, rotating the bin assembly 108, 308 from the deployed position to the home position may include reducing an angular velocity of the bin assembly 108, 308, via the hydraulic system 116, 316, before the bin assembly 108, 308 is in the home position, the hydraulic system 116, 316 being operably coupled to the frame 104, 304 and the linkage system 112, 312. In other examples, rotating the bin assembly 108, 308 from the deployed position to the home position may include reducing an angular velocity of the bin assembly 108, 308, via the electric actuator, before the bin assembly 108, 308 is in the home position, the electric actuator being operably coupled to the frame 104, 304 and the linkage system 112, 312.

Further, as the bin assembly 108, 308 rotates between the home position and the deployed position the center of gravity of the container dumper 100, 300 remains within the envelope of the frame 104, 304. For example, as best illustrated in FIG. 1, when the bin assembly 108 is in the home position, the center of gravity 110 is disposed within the envelope of the frame 104. While the bin assembly 108 rotates to the deployed position and once in the deployed position, the center of gravity 110 remains within the envelope of the frame 104. For examples, as best illustrated in FIG. 3, the center of gravity 110 remains within the envelope of the frame 104 when the bin assembly 108 is in the deployed position. Accordingly, the container dumper 100, 300 remains statically stable as the bin assembly 108, 308 rotates between the home position and the deployed position.

There may be instances where the items in a container within the bin assembly 108, 308 are not emptied when the bin assembly 108, 308 reaches the deployed position. For example, the items in the container may stick to the container or become caught on a surface of the container or the bin assembly 108, 308 thereby preventing the items from leaving the bin assembly 108, 308 when in the deployed position. However, even in such examples, the center of gravity 114 (FIG. 3) remains within the envelope of the frame 104. So configured, the container dumper 100, 300 remains statically stable even in the event that items in the container within the bin assembly 108, 308 are not emptied when the bin assembly 108, 308 reaches the deployed position.

Figure 4:
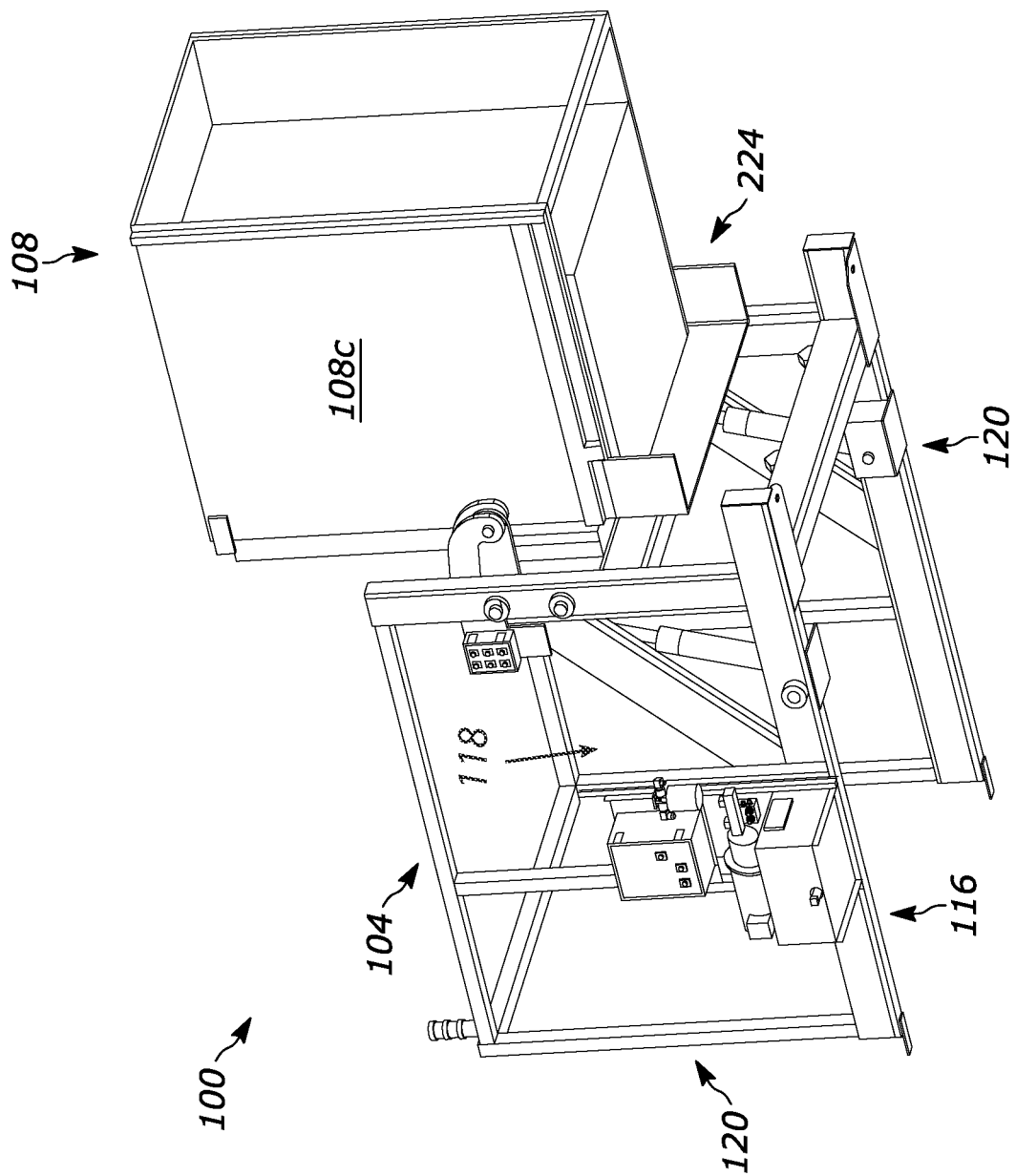
FIG. 4 is a bottom-up perspective view of the rotating container dumper of FIG. 3.
Figure 5:
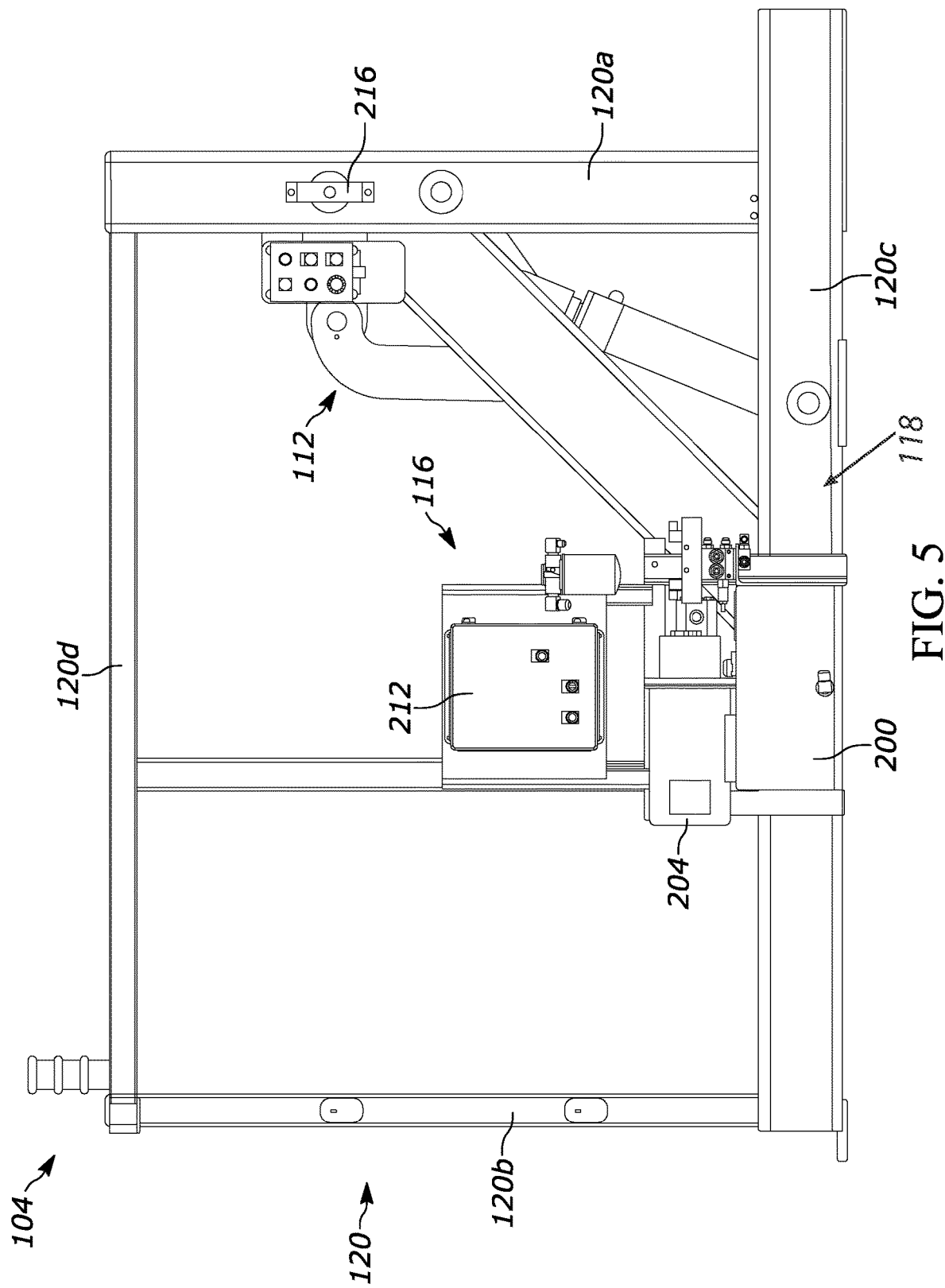
FIG. 5 is a side view of a section of the rotating container dumper of FIG. 1 with certain elements removed for visibility.

In some embodiments of the container dumper 100, the controller 212 can operate the hydraulic system 116, or the electric actuator, in a manner that shakes the bin assembly 108 prior to or when the bin assembly 108 reaches the deployed position, as illustrated in FIGS. 3 and 4. In particular, the controller 212 is configured to operate the plurality of pistons, or electric actuator, such that the bin assembly 108 shakes at or before the bin assembly 108 is in the deployed position. Shaking the bin assembly 108 may shift, or move, the contents in the container retained within the bin assembly 108, which creates a greater likelihood that all of the contents in the container retained within the bin assembly 108 are dumped out when the bin assembly 108 is in the deployed position (FIGS. 3 and 4). While not illustrated herein, the container dumper 300 illustrated in FIGS. 9-11 may also include a controller that operates the hydraulic system 316, or electric actuator, in a manner that shakes the bin assembly 308 prior to or when the bin assembly 108 reaches the deployed position, as illustrated in FIG. 11.

In some other embodiments of the container dumper 100, the controller 212 can operate the hydraulic system 116, or the electric actuator, in a manner that reduces the angular velocity of the bin assembly 108 while rotating from the deployed position to the home position, as illustrated in FIGS. 1 and 2. In particular, the controller 212 may be configured to operate the plurality of pistons, or electric actuator, such that an angular velocity of the bin assembly 108 is reduced before the bin assembly 108 is in the home position (FIGS. 1 and 2). Reducing the angular velocity of the bin assembly 108 during rotation may prevent the bin assembly 108 from slamming, or otherwise forcefully coming into contact with the surface on which the container dumper 100 sits. Advantageously, this may prevent, or at least mitigate, damage to the bin assembly 108, the surface on which the container dumper 100 sits, and/or users working or standing around the container dumper 100. While not illustrated herein, the container dumper 300 illustrated in FIGS. 9-11 may also include a controller that operates the hydraulic system 316, or electric actuator, such that an angular velocity of the bin assembly 308 is reduced before the bin assembly 308 is in the home position (FIGS. 9 and 10).

The invention claimed is:

1. A rotating container dumper, comprising:
 a bin assembly having at least one opening for receiving a container;
 a frame including a plurality of side members defining a frame volume and configured to receive the bin assembly; and
 a linkage system operably coupled to the frame and the bin assembly, the linkage system includes a first set of bars and a second set of bars, each of the first and second sets of bars includes a first bar, a second bar, and a third bar, the first bar being rotatably coupled to the frame and the second bar, the second bar being rotatably coupled to the first and third bars, and the third bar being rotatably coupled to the second bar and the frame;
 wherein the linkage system is configured to rotate the bin assembly between a home position, where the bin assembly is disposed within the frame volume and a first opening of the at least one opening is positioned at a top of the bin assembly, and a deployed position, where the bin assembly is disposed outside of the frame and the first opening of the at least one opening is positioned at a bottom of the bin assembly.

2. The rotating container dumper of claim 1, wherein the linkage system is configured to rotate the bin assembly 180 degrees between the home position and the deployed position.

3. The rotating container dumper of claim 1, wherein the first bar has a linear, elongate body, the second bar has a body having a J-shape, and the third bar has a body having a Y-shape.

4. The rotating container dumper of claim 1, further comprising a hydraulic system or an electric actuator that is operably coupled to the linkage system and the frame, the hydraulic system including a hydraulic fluid reservoir, a pump, a plurality of pistons, a plurality of hoses fluidly coupling the hydraulic fluid reservoir, the pump, and the at least one piston, and a controller.

5. The rotating container dumper of claim 4, wherein a first piston of the plurality of pistons is operably coupled to the first set of bars and a second piston of the plurality of pistons is operably coupled to the second set of bars, such that actuation of the first and second pistons of the plurality of pistons causes the first and second sets of bars, respectively, to rotate thereby causing the bin assembly to rotate.

6. The rotating container dumper of claim 4, wherein the controller is configured to operate the plurality of pistons such that the bin assembly shakes at or before the bin assembly is in the deployed position.

7. The rotating container dumper of claim 4, wherein the controller is configured to operate the plurality of pistons such that an angular velocity of the bin assembly is reduced before the bin assembly is in the home position.

8. The rotating container dumper of claim 4, further comprising at least one sensor disposed on the frame and communicatively coupled to the controller, the at least one sensor configured to detect an angular position of the bin assembly.

9. The rotating container dumper of claim 1, wherein the frame includes a plurality of cross members extending between the plurality of side members.

10. The rotating container dumper of claim 9, further comprising a coupling structure that is secured to the bin assembly and operably couples the bin assembly and the linkage system.

11. The rotating container dumper of claim 10, wherein the coupling structure includes a coupling member, a first stopper coupled to and extending upwardly from the coupling member, and a second stopper coupled to and extending downwardly from the coupling member, the coupling member being coupled to the bin assembly and extending between the first and second sets of bars of the linkage system.

12. The rotating container dumper of claim 11, wherein when the bin assembly is in the home position, the second stopper is in contact with a first cross member of the plurality of cross members, and when the bin assembly is in the deployed position, the first stopper is in contact with a second cross member of the plurality of cross members.

13. A method of rotating a container dumper, the method comprises:
providing a frame having a plurality of side members defining a frame volume and a plurality of cross members extending between the plurality of side members;
disposing a bin assembly having at least one opening within the frame volume in a home position where a first opening of the at least one opening is positioned at a top of the bin assembly, a linkage system operably coupling the bin assembly to the frame, the linkage system includes a first set of bars and a second set of bars, each of the first and second sets of bars includes a first bar, a second bar, and a third bar, the first bar being rotatably coupled to the frame and the second bar, the second bar being rotatably coupled to the first and third bars, and the third bar being rotatably coupled to the second bar and the frame;
rotating the bin assembly, via the linkage system, from the home position to a deployed position, where the bin assembly is disposed outside of the frame and the first opening of the at least one opening is positioned at a bottom of the bin assembly; and
rotating the bin assembly, via the linkage system, from the deployed position to the home position.

14. The method of claim 13, wherein rotating the bin assembly from the home position to the deployed position includes rotating the bin assembly 180 degrees from the home position to the deployed position, and
wherein rotating the bin assembly from the deployed position to the home position includes rotating the bin assembly 180 degrees from the deployed position to the home position.

15. The method of claim 13, wherein disposing the bin assembly within the frame includes disposing the bin assembly within the frame such that a center of gravity of the container dumper remains within an envelope of the frame when rotating the bin assembly from the home position to the deployed position.

16. The method of claim 13, wherein disposing the bin assembly within the frame includes disposing the bin assembly within the frame such that a center of gravity of the container dumper remains within an envelope of the frame when rotating the bin assembly from the deployed position to the home position.

17. The method of claim 13, wherein rotating the bin assembly from the home position to the deployed position includes exerting a clockwise rotational force on the linkage system via a hydraulic system, the hydraulic system operably coupled to the frame and the linkage system, and
wherein rotating the bin assembly from the deployed position to the home position includes exerting a counterclockwise rotational force on the linkage system via the hydraulic system.

18. The method of claim 13, wherein rotating the bin assembly from the home position to the deployed position includes shaking the bin assembly, via a hydraulic system or an electric actuator, at or before the bin assembly is in the deployed position, the hydraulic system or the electric actuator operably coupled to the frame and the linkage system.

19. The method of claim 13, wherein rotating the bin assembly from the deployed position to the home position includes reducing an angular velocity of the bin assembly, via a hydraulic system or an electric actuator, before the bin assembly is in the home position, the hydraulic system or the electric actuator operably coupled to the frame and the linkage system.

20. A rotating dumper, comprising:
a bin assembly having at least one opening for receiving a container;
a frame including a plurality of side members defining a frame volume and configured to receive the bin assembly;
a linkage system operably coupled to the frame and the bin assembly, the linkage system includes a first set of bars and a second set of bars, each of the first and second sets of bars includes a first bar, a second bar, and a third bar, the first bar being rotatably coupled to the frame and the second bar, the second bar being rotatably coupled to the first and third bars, and the third bar being rotatably coupled to the second bar and the frame; and
a coupling member extending between the linkage system and the frame,
wherein, the linkage system is configured to rotate the bin assembly between a home position, where the bin assembly is disposed within the frame volume and a first opening of the at least one opening is positioned at a top of the bin assembly, and a deployed position, where the bin assembly is disposed outside of the frame and the first opening of the at least one opening is positioned at a bottom of the bin assembly.

21. The rotating dumper of claim 20, wherein the linkage system is configured to rotate the bin assembly 180 degrees between the home position and the deployed position.

22. The rotating dumper of claim 21, wherein the first bar has a linear body, the second bar has a linear body, and the third bar has a body having a J-shape.

23. The rotating dumper of claim 21, further comprising a hydraulic system or an electric actuator that is operably coupled to the linkage system and the frame, the hydraulic system including a fluid reservoir, a pump, a piston, a plurality of hoses fluidly coupling the hydraulic fluid reservoir, the pump, and the piston, and a controller.

24. The rotating dumper of claim 23, wherein the piston is operably coupled to the set of bars such that actuation of the piston causes the set of bars to rotate thereby causing the bin assembly to rotate.

25. The rotating dumper of claim 23, wherein the controller is configured to operate the piston such that the bin assembly shakes at or before the bin assembly is in the deployed position.

26. The rotating dumper of claim 23, wherein the controller is configured to operate the piston such that an angular velocity of the bin assembly is reduced before the bin assembly is in the home position.

27. The rotating dumper of claim 23, further comprising at least one sensor disposed on the frame and communicatively coupled to the controller, the at least one sensor configured to detect an angular position of the bin assembly.

28. The rotating dumper of claim 20, wherein the frame includes a plurality of cross members extending between the plurality of side members.

29. The rotating dumper of claim 28, wherein at least one cross member of the plurality of cross members has rigidity that prevents torsional deformation as the linkage system rotates the bin assembly from the home position to the deployed position.

30. The rotating dumper of claim 20, further comprising a fourth bar that is coupled to the frame opposite the first bar, the fourth bar being rotatably coupled to a cross member.

* * * * *

UNITED STATES PATENT AND TRADEMARK OFFICE
CERTIFICATE OF CORRECTION

| | | |
|---|---|---|
| PATENT NO. | : 11,866,274 B2 | Page 1 of 1 |
| APPLICATION NO. | : 17/165132 | |
| DATED | : January 9, 2024 | |
| INVENTOR(S) | : Evaldas Latvys | |

It is certified that error appears in the above-identified patent and that said Letters Patent is hereby corrected as shown below:

In the Claims

At Column 14, Line 40, "claim 22," should be -- claim 20, --.

At Column 14, Line 43, "claim 23," should be -- claim 20, --.

Signed and Sealed this
First Day of October, 2024

Katherine Kelly Vidal
*Director of the United States Patent and Trademark Office*